United States Patent
Konowalczyk

(10) Patent No.: US 12,352,504 B2
(45) Date of Patent: Jul. 8, 2025

(54) ENERGY BANK WITH HEAT PUMP INPUT CIRCUIT AND HOT WATER OUTPUT CIRCUIT

(71) Applicant: OCTOPUS ENERGY HEATING LIMITED, London (GB)

(72) Inventor: Peter Konowalczyk, London (GB)

(73) Assignee: Octopus Energy Heating Limited, London (GB)

( * ) Notice: Subject to any disclaimer, the term of this patent is extended or adjusted under 35 U.S.C. 154(b) by 0 days.

(21) Appl. No.: 18/229,969

(22) Filed: Aug. 3, 2023

(65) Prior Publication Data

US 2023/0375281 A1    Nov. 23, 2023

Related U.S. Application Data

(63) Continuation of application No. PCT/IB2022/051051, filed on Feb. 7, 2022.

(30) Foreign Application Priority Data

Feb. 7, 2021    (GB) ..................................... 2101678
Jul. 2, 2021     (GB) ..................................... 2109593
(Continued)

(51) Int. Cl.
    *F28D 20/00*   (2006.01)
    *F24D 11/00*   (2022.01)
    (Continued)

(52) U.S. Cl.
    CPC ........ *F28D 20/0034* (2013.01); *F24D 11/003* (2013.01); *F24D 11/02* (2013.01);
    (Continued)

(58) Field of Classification Search
    CPC ............... F28D 20/0034; F28D 20/021; F28D 2020/0078; F28D 2020/0082; F24H 15/31;
    (Continued)

(56) References Cited

U.S. PATENT DOCUMENTS 4,291,756 A  *  9/1981   Bracht ................ F24D 11/0214
                                                                126/643
4,609,036 A  *  9/1986   Schrader ............... F28D 20/021
                                                                126/618
(Continued)

FOREIGN PATENT DOCUMENTS

AT            504285 A1      4/2008
CN         201191144 Y       2/2009
(Continued)

OTHER PUBLICATIONS

WO-2013175971-A1 Machine Translation (Year: 2013).*
(Continued)

*Primary Examiner* — Travis Ruby
(74) *Attorney, Agent, or Firm* — Kilpatrick Townsend & Stockton LLP

(57) ABSTRACT

An energy bank includes an enclosure, and within the enclosure: an input-side circuit for connection to an energy source; an output-side circuit for connection to an energy sink; and a phase-change material (PCM) for the storage of energy; wherein the PCM within the enclosure includes a plurality of resilient bodies that are configured to: reduce in volume in response to an increase in pressure caused by a phase change of the PCM; and expand again in response to a reduction in pressure caused by a reverse phase change of the PCM. The energy bank may have sensors to provide measurement data indicative of the amount of energy stored as latent heat in the PCM. An installation comprises an in-building hot water system including such an energy bank, (Continued)

the input-side circuit being coupled to a heat pump, and the output-side circuit being coupled to the in-building hot water system.

20 Claims, 6 Drawing Sheets

(30) Foreign Application Priority Data

| | | |
|---|---|---|
| Jul. 2, 2021 | (GB) | 2109594 |
| Jul. 2, 2021 | (GB) | 2109596 |
| Jul. 2, 2021 | (GB) | 2109597 |
| Jul. 2, 2021 | (GB) | 2109598 |
| Jul. 2, 2021 | (GB) | 2109599 |
| Jul. 2, 2021 | (GB) | 2109600 |

(51) Int. Cl.
| | |
|---|---|
| *F24D 11/02* | (2006.01) |
| *F24D 17/02* | (2006.01) |
| *F24D 19/10* | (2006.01) |
| *F24H 15/212* | (2022.01) |
| *F24H 15/238* | (2022.01) |
| *F24H 15/31* | (2022.01) |
| *F28D 20/02* | (2006.01) |
| *G05D 7/06* | (2006.01) |

(52) U.S. Cl.
CPC ......... *F24D 17/02* (2013.01); *F24D 19/1054* (2013.01); *F24H 15/212* (2022.01); *F24H 15/238* (2022.01); *F24H 15/31* (2022.01); *F28D 20/021* (2013.01); *G05D 7/0682* (2013.01); *F24D 2200/08* (2013.01); *F24D 2200/12* (2013.01); *F24D 2200/14* (2013.01); *F24D 2220/042* (2013.01); *F24D 2220/044* (2013.01); *F24D 2220/10* (2013.01); *F28D 2020/0078* (2013.01); *F28D 2020/0082* (2013.01)

(58) Field of Classification Search
CPC .... F24H 15/212; F24H 15/238; F24D 11/003; F24D 11/02; F24D 17/02; F24D 19/1054; F24D 2200/08; F24D 2200/12; F24D 2200/14; F24D 2220/042; F24D 2220/044; F24D 2220/10; G05D 7/0682
See application file for complete search history.

(56) References Cited

U.S. PATENT DOCUMENTS

| | | |
|---|---|---|
| 4,798,059 A | 1/1989 | Morita |
| 2011/0271953 A1 | 11/2011 | Wortmann et al. |
| 2017/0219294 A1* | 8/2017 | Longis ............... F28D 20/023 |
| 2018/0038616 A1 | 2/2018 | Scheers et al. |
| 2018/0058769 A1* | 3/2018 | Bidner ................ F28F 27/00 |
| 2021/0108861 A1* | 4/2021 | Nomura ............. F28D 20/021 |
| 2021/0318027 A1 | 10/2021 | Boros et al. |
| 2022/0163270 A1* | 5/2022 | Maharmeh .......... F28D 20/021 |

FOREIGN PATENT DOCUMENTS

| | | |
|---|---|---|
| CN | 201265954 Y | 7/2009 |
| CN | 203758014 U | 8/2014 |
| CN | 111189348 A | 5/2020 |
| CN | 111197864 A | 5/2020 |
| CN | 111750528 A | 10/2020 |
| CN | 111811142 A | 10/2020 |
| DE | 29921889 U1 | 6/2000 |
| DE | 10006564 A1 | 8/2000 |
| DE | 10151253 C1 | 11/2002 |
| DE | 102008043030 A1 | 4/2010 |
| DE | 102014225693 A1 | 6/2016 |
| EP | 0007538 A1 | 2/1980 |
| EP | 1684035 A2 | 7/2006 |
| EP | 2727646 A1 | 5/2014 |
| JP | 5795534 A | 6/1982 |
| JP | S5812992 A | 1/1983 |
| JP | 01256792 A | 10/1989 |
| JP | 1144495 A | 2/1999 |
| JP | 2012002469 A | 1/2012 |
| KR | 20100030141 A | 3/2010 |
| KR | 20120069926 A | 6/2012 |
| WO | WO-2013175971 A1 * | 11/2013 ............ F25D 11/006 |
| WO | 2015056260 A1 | 4/2015 |
| WO | 2020209979 A2 | 10/2020 |

OTHER PUBLICATIONS

GB2109597.1, "Search Report", Aug. 10, 2021, 1 page.
GB2109593.0, "Search Report", Aug. 20, 2021, 1 page.
GB2109594.8, "Search Report", Aug. 12, 2021, 1 page.
GB2109596.3, "Search Report", Aug. 10, 2021, 1 page.
GB2109598.9, "Search Report", Aug. 10, 2021, 1 page.
GB2109599.7, "Examination Report", Feb. 14, 2023, 2 pages.
GB2109599.7, "Search Report", Aug. 10, 2021, 1 page.
GB2109600.3, "Search Report", Aug. 20, 2021, 1 page.
GB2215387.8, "Search Report", Jan. 16, 2023, 1 page.
GB2300970.7, "Search Report", Feb. 20, 2023, 2 pages.
GB2304349.0, "Search Report", Apr. 25, 2023, 1 page.
PCT/IB2022/051051, "International Search Report/Written Opinion", Aug. 11, 2022, pp. 1-14.

* cited by examiner

ENERGY BANK WITH HEAT PUMP INPUT CIRCUIT AND HOT WATER OUTPUT CIRCUIT

CROSS-REFERENCES TO RELATED APPLICATIONS

This application claims priority to and is a continuation of International Patent Application No. PCT/IB2022/051051, filed Feb. 7, 2022; which claims priority from GB Patent Application No. 2101678.7, filed Feb. 7, 2021, GB Patent Application No. 2109593.0, filed Jul. 2, 2021, GB Patent Application No. 2109594.8, filed Jul. 2, 2021, GB Patent Application No. 2109596.3, filed Jul. 2, 2021, GB Patent Application No. 2109597.1, filed Jul. 2, 2021, GB Patent Application No. 2109598.9, filed Jul. 2, 2021, GB Patent Application No. 2109599.7, filed Jul. 2, 2021, and GB Patent Application No. 2109600.3, filed Jul. 2, 2021, the entire contents of which are hereby incorporated by reference in their entirety for all purposes.

TECHNICAL FIELD

The present disclosure variously relates to methods, systems and apparatus for use in helping consumers reduce their energy usage, and in particular to energy storage arrangements or energy banks, installations and systems including such energy banks, and corresponding methods.

BACKGROUND OF THE INVENTION

According to Directive 2012/27/EU buildings represent 40% of the final energy consumption and 36% of $CO_2$ emissions. The EU Commission report of 2016 "Mapping and analyses of the current and future (2020-2030) heating/cooling fuel deployment (fossil/renewables)" concluded that in EU households, heating and hot water alone account for 79% of total final energy use (192.5 Mtoe). The EU Commission also report that, "according to 2019 figures from Eurostat, approximately 75% of heating and cooling is still generated from fossil fuels while only 22% is generated from renewable energy. To fulfil the EU's climate and energy goals, the heating and cooling sector must sharply reduce its energy consumption and cut its use of fossil fuels. Heat pumps (with energy drawn from the air, the ground or water) have been identified as potentially significant contributors in addressing this problem.

In many countries, there are policies and pressures to reduce carbon footprint. For example, in the UK in 2020 the UK Government published a whitepaper on a Future Homes Standard, with proposals to reduce carbon emissions from new homes by 75 to 80% compared to existing levels by 2025. In addition, it was announced in early 2019 that there would be a ban on the fitment of gas boilers to new homes from 2025. It is reported that in the UK at the time of filing 78% of the total energy used for the heating of buildings comes from gas, while 12% comes from electricity.

The UK has a large number of small, 2-3 bedroom or less, properties with gas-fired central heating, and most of these properties use what are known as combination boilers, in which the boiler acts as an instantaneous hot water heater, and as a boiler for central heating. Combination boilers are popular because they combine a small form factor, provide a more or less immediate source of "unlimited" hot water (with 20 to 35 kW output), and do not require hot water storage. Such boilers can be purchased from reputable manufactures relatively inexpensively. The small form factor and the ability to do without a hot water storage tank mean that it is generally possible to accommodate such a boiler even in a small flat or house-often wall-mounted in the kitchen, and to install a new boiler with one man day's work. It is therefore possible to get a new combi gas boiler installed inexpensively. With the imminent ban on new gas boilers, alternative heat sources will need to be provided in place of gas combi boilers. In addition, previously fitted combi boilers will eventually need to be replaced with some alternative.

Although heat pumps have been proposed as a potential solution to the need to reduce reliance on fossil fuels and cut $CO_2$ emissions, they are currently unsuited to the problem of replacing gas fired boilers in smaller domestic (and small commercial) premises or a number of technical, commercial and practical reasons. They are typically very large and need a substantial unit on the outside of the property. Thus they cannot easily be retro-fitted into a property with a typical combi boiler. A unit capable of providing equivalent output to a typical gas boiler would currently be expensive and may require significant electrical demand. Not only do the units themselves cost multiples of the equivalent gas fired equivalent, but also their size and complexity means that installation is technically complex and therefore expensive. A further technical problem is that heat pumps tend to require a significant time to start producing heat in response to demand, perhaps 30 seconds for self-checking then some time to heat up-so a delay of 1 minute or more between asking for hot water and its delivery. For this reason attempted renewable solutions using heat pumps and/or solar are typically applicable to large properties with room for a hot water storage tank (with space demands, heat loss and *legionella* risk).

There therefore exists a need to provide a solution to the problem of finding a suitable technology to replace gas combi boilers, particularly for smaller domestic dwellings.

More generally, further developments are sought for broadening the applicability of heat pumps. Aspects of the present disclosure provide solutions in respect of these long felt wants.

Other concerns also arise from the need to reduce the amount of carbon dioxide released into the atmosphere and more generally to reduce the amount of energy wasted by households.

SUMMARY OF THE INVENTION

In a first aspect there is provided an energy bank, the energy bank comprising an enclosure, and within the enclosure: an input-side circuit for connection to an energy source; an output-side circuit for connection to an energy sink; and a phase-change material for the storage of energy; wherein the phase-change material within the enclosure includes a plurality of resilient bodies that are configured to: reduce in volume in response to an increase in pressure caused by a phase change of the phase-change material; and expand again in response to a reduction in pressure caused by a reverse phase change of the phase-change material.

In a second aspect there is provided an energy bank including a heat exchanger, the energy bank comprising an enclosure, and within the enclosure: an input-side circuit of the heat exchanger for connection to an energy source; an output-side circuit of the heat exchanger for connection to an energy sink; and a phase-change material for the storage of energy; wherein the phase-change material within the enclosure includes a plurality of resilient bodies that are configured to: reduce in volume in response to an increase in pressure caused by a phase change of the phase-change material; and expand again in response to a reduction in pressure caused by a reverse phase change of the phase-change material. Such an energy bank provides a convenient way to interface between a source of renewable energy, such as a heat pump, and a hot water supply installation, and the provision of the resilient bodies provides a way to compensate for expansion and contraction resulting from PCM phase changes.

In energy banks according to the first or second aspect the enclosure may include a plurality of sealed bodies, the phase-change material being enclosed within the sealed bodies, the energy bank being configured to contain an energy transfer liquid to surround the plurality of sealed bodies within the enclosure, and wherein the plurality of resilient bodies are contained within the plurality of sealed bodies. In such energy banks the input-side circuit of the heat exchanger may be defined by a conduit having an input and an output, the input and the output being connected by an imperforate conduit wall so that water introduced at the input is guided by the conduit wall to the outlet without mixing with the energy transfer liquid within the enclosure, and the energy transfer liquid may be sealed within the enclosure.

Alternatively, in energy banks that include a plurality of sealed bodies, with the phase-change material enclosed within the sealed bodies, the input-side circuit of the heat exchanger may include one or more input ports and one or more output ports communicating with the interior of the enclosure, the arrangement being such that a heat transfer liquid introduced into the interior of the enclosure via one or more of the input ports is configured to flow past and over the plurality of sealed bodies within the enclosure and to exit the enclosure via one or more of the output ports. With such an arrangement energy transfer between the energy transfer liquid and the phase-change material may be quicker (both to the PCM and out of the PCM). In addition, such an arrangement facilitates the use of multiple PCMs with different transition temperatures. The energy transfer liquid can conveniently be water or a water based solution of inhibitor-which is particularly useful if the output of the input circuit of the energy bank is used to feed a heating system-particularly one using copper pipes and copper-based fittings, and especially if the system also includes ferrous components such as radiators.

In a third aspect there is provided an energy bank, the energy bank comprising an enclosure, and within the enclosure: an input-side circuit for connection to an energy source; an output-side circuit for connection to an energy sink; and a phase-change material for the storage of energy; wherein the phase-change material within the enclosure is contained within a plurality of sealed containers; the enclosure also containing a heat transfer liquid to transfer heat to the output-side circuit from the phase-change material, the liquid being separated from the phase-change material by walls of the sealed containers; the phase-change material including a plurality of resilient bodies that are configured to: reduce in volume in response to an increase in pressure caused by a phase change of the phase-change material; and expand again in response to a reduction in pressure caused by a reverse phase change of the phase-change material.

The resilient bodies of the first through third aspects may be coupled to a matrix or lattice structure which serves to restrict displacement of the resilient bodies. In this way, the resilient bodies can be prevented from aggregating, and a given distribution may be maintained.

Optionally, the input-side circuit and the output-side circuit within the enclosure are defined by tubular bodies, elongate protrusions extending into the phase-change material from each of the tubular bodies, wherein the elongate protrusions have higher thermal conductivity than the phase-change material. Such an energy storage arrangement helps speed up energy between the input-side circuit and the PCM, and between the PCM and the output-side circuit, and across the PCM, reducing the delay between the arrival of heat at the input to heat exchanger and its output to the energy sink. This is of particular significance in the application of the energy storage unit to the interface unit application which is described extensively in this application. Optionally, the elongate protrusions together form one or more meshes. Such an arrangement may facilitate assembly and reduce the risk that the protrusions will be deformed during assembly. It may also help to improve the rate of energy transfer.

The elongate protrusions may be in the form of blades. Such an arrangement facilitates an increase in surface area of individual protrusions, improving heat transfer and also possibly making the protrusions more resistant to being distorted during assembly of the heat exchanger.

The elongate protrusions may be of filamentary form, optionally in the form of wires. The use of protrusions in the form of filaments or wires is less likely to impede thermally induced circulation of the phase-change material within the heat exchanger.

The elongate protrusions may comprise copper or a copper alloy. This provides excellent thermal conductivity, ease of fabrication, and compatibility with copper, the material favored for forming the coils of the heat exchanger. As most domestic hot water systems, at least in the UK, continue to be made using copper pipe, making at least the heat exchanger output side coil (but preferably both coils) from copper ensures electrochemical compatibility with existing pipework of the hot water system.

Each elongate protrusion may be welded to the tubular body from which it extends. This helps to reduce thermal resistance between the heat exchanger coils and the heat dissipating protrusions, and hence helps reduce the thermal resistance across the heat exchanger.

The elongate protrusions may alternatively comprise carbon fiber. Carbon fiber can provide excellent thermal conductivity, and the ability to form simple or complex shapes by molding carbon fiber reinforced composite structures.

The phase-change material in the energy bank may comprise one or more paraffin waxes. Paraffin waxes offer good latent heat capacity, are of low chemical reactivity, with good stability and low toxicity. The phase-change material in the energy bank may be selected from among the paraffins listed later in the specification.

The phase-change material in the energy bank may comprise a salt hydrate, such as the phase-change material comprises $Na_2S_2O_3 \cdot 5H_2O$ or $CH_3COONa \cdot 3H_2O$.

The phase-change material in the energy bank may have a phase transformation at a temperature of between 40 and 60 Celsius. PCMs with phase transitions in this temperature range are particularly suitable for directly heating domestic hot water, while being compatible with efficient operating temperatures for heat pumps.

The enclosure of the energy bank may be a generally rectangular cuboid defined by a first side having a length between 300 mm and 600 mm, a second side having a length between 300 mm and 600 mm, and a third side having a length between 150 mm and 350 mm. By making the enclosure in this size range it should be possible to create a device which is a direct physical replacement for a previously installed combi gas boiler, as well as providing a unit suitable for installation in lieu of gas combi boilers in new installations.

The enclosure of the energy bank may be contained within a thermally insulating jacket 13. Although the energy storage material within the energy bank is only likely to be kept at between 40 and 60 Celsius, overall energy efficiency will be improved by the provision of a suitable thermally insulated jacket 13 or outer enclosure.

The energy bank may further comprise an electrical heater within the enclosure. This provides the ability to "charge" the PCM even when the heat pump is unavailable, as well as enabling the use of "cheap" electricity, taking advantage for example of temporary low supply tariffs or perhaps generated from a domestic photovoltaic or wind generation installation.

The phase-change material in the energy bank may have an energy storage capacity, based on the latent heat of fusion of the phase-change material, of between 2 and 5 MJoules. An energy storage capacity in this range should be suitable for providing sufficient instantaneous hot water in applications where the energy storage arrangement is used to enable a heat pump to be used in place of a domestic gas combi boiler.

The energy bank may further comprise one or more sensors to provide measurement data indicative of the amount of energy stored as latent heat in the phase-change material. A processor may be coupled to the sensing arrangement and configured to estimate an energy content of the phase-change material based on the measurement. Such an arrangement provides a means by which a processor or controller of the installation can be provided with information about the current status of the PCM.

The energy bank may further comprise an optical source to launch light into the phase-change material, and the one or more sensors includes an optical sensing arrangement to detect light launched from the optical source after the light has passed through the phase-change material. Such an arrangement provides an alternative means by which a processor or controller of the installation can be provided with information about the current status of the PCM.

The optical source may be controllable to produce light of different colors and the optical sensing arrangement is configured to detect at least some of different colors. By using different colors of light, more accurate determination of the current status of the PCM may be possible. The optical source may comprises a plurality of separately activatable devices. The energy bank may further comprise an acoustic source configured to launch sound into the phase-change material, and an acoustic sensing arrangement to detect sound launched from the acoustic source after the sound has passed through the phase-change material. Each of these approaches provides an alternative means by which a processor or controller of the installation can be provided with information about the current status of the PCM.

In a fourth aspect there is provided an installation comprising an in-building hot water system including an energy bank according to any variant of the first aspect, the input-side circuit of the heat exchanger being coupled to a heat pump, and the output-side circuit of the heat exchanger being coupled to the in-building hot water system. Such an arrangement provides a means to use a heat pump to power a hot water supply installation without the need for a hot water storage tank. This can be particularly attractive where there is little or no free space to accommodate a hot water cylinder, such as when a gas combi boiler is being replaced.

The installation may further comprise a processor coupled to one or more sensors and configured to make a determination to trigger the starting of the heat pump based on measurement data from one or more sensors. In this way, the installation can 'call' on the heat pump when there is demand for hot water, and the amount of water flow that triggers such a call may be configured by adjusting settings of the processor.

The hot water supply system of the installation may include a flow sensor to provide a signal in response to the opening of an outlet of the hot water system, the processor being coupled to the flow sensor and configured to perform a determination of the amount of energy stored as latent heat in the phase-change material, and based on that determination to decide whether to provide a start signal to the heat pump. In this way, the installation can "call" on the heat pump when there is demand for hot water that either cannot be satisfied by the energy stored in the PCM, or would better be satisfied by the heat pump (e.g., when it is determined that a bath is being run) and the amount of water flow that triggers such a call may be configured by adjusting settings of the processor.

The quantity of phase-change material in the installation preferably has enough latent heat capacity to heat to a predetermined temperature a predetermined quantity of water in the interval from the opening of an outlet of the hot water supply system until at least the heat pump begins to heat water in the hot water supply system.

BRIEF DESCRIPTION OF THE DRAWINGS

Embodiments of various aspects of the disclosure will now be described by way of example only, with reference to the accompanying drawings, in which.

DETAILED DESCRIPTION OF THE INVENTION

Figure 1:
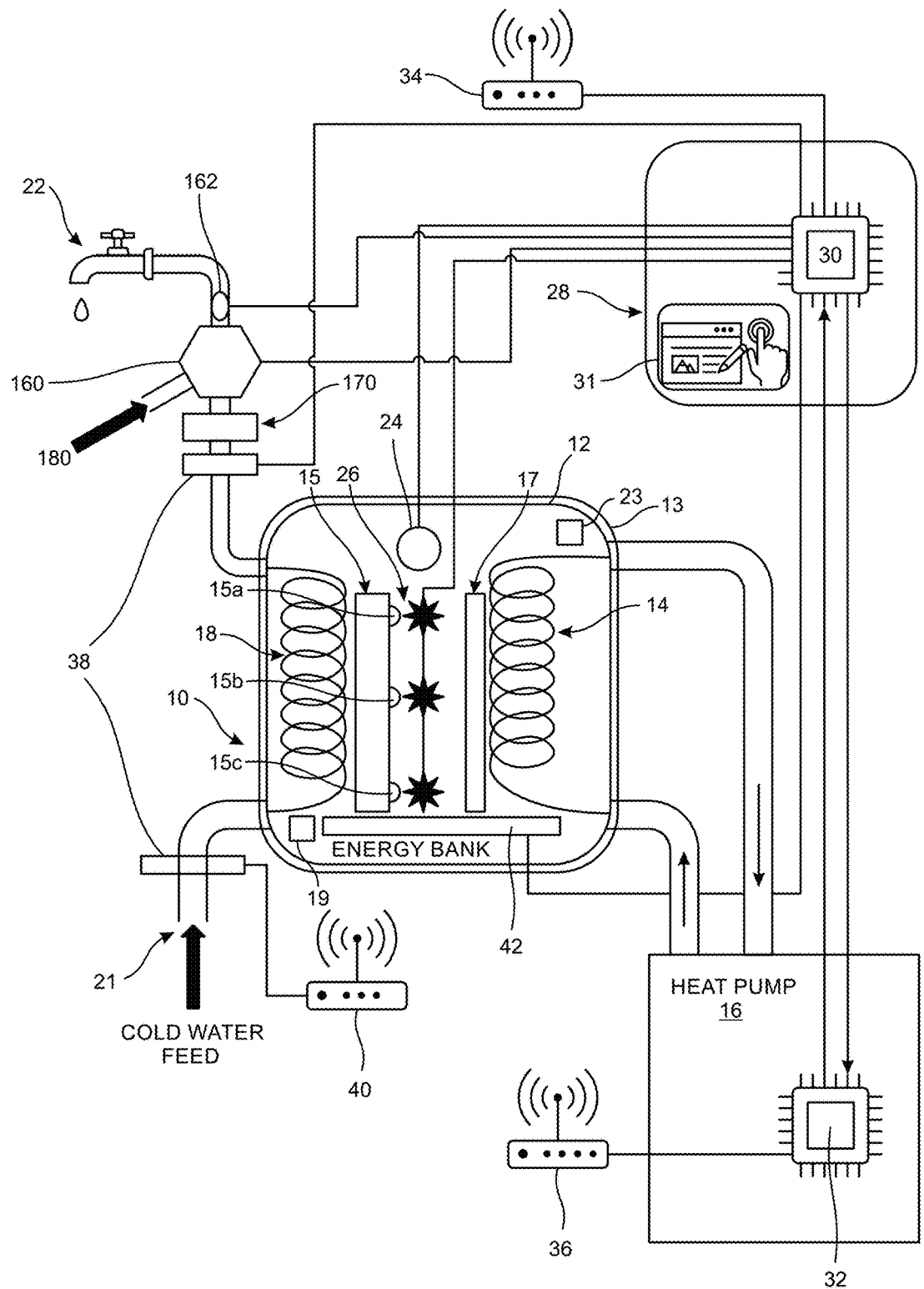
FIG. 1 is a schematic diagram showing an energy bank including a phase-change material and a heat exchanger coupled to a heat pump energy source, the energy bank including one or more sensors to provide measurement data indicative of the amount of energy stored as latent heat in the phase-change material.

One of the many constraints on the applicability of heat pumps is their relatively limited ability to satisfy demand for hot water—at least when compared to instantaneous gas and electric water heaters, such as combi boilers, compared to their strengths as sources of heat for space heating. As noted earlier, for the typically modestly sized dwellings of the UK, space heating demands are commonly as low as 4 kW, whereas gas combi-boilers even in modest one or two bed flats can typically provide 20 kW to 30 k W (e.g., 24 kW) for instant water heating. The 4 kW space heating demand is readily achievable in Europe with even an air source heat pump, but a unit that could provide 24 kW would be unacceptably large and expensive. Heat pumps suffer from a further limitation in respect of their application to domestic hot water supplies, and that is the long lag between a heat pump receiving a start signal and hot water actually being supplied by the heat pump. Generally, this lag is well over a minute, and sometimes as much as two minutes or more. While that doesn't at first sight sound significant, when one realizes that for things like handwashing-one of the most common uses of hot water in a domestic setting, the average time for which a hot tap runs is between 30 seconds and 1 minute—so it becomes clear that heat pumps have a significant hurdle to overcome. Typically, this problem is addressed by storing hot water—in a hot water storage tank, so that it is available on demand. But that solution is unattractive for smaller dwellings, such as the kinds of one, two and three bed properties in the UK that currently make use of gas combination boilers—and which are almost universally installed without an external hot water storage tank.

One technology which has potential to improve the applicability of heat pumps to the demands of, in particular, domestic hot demands, is thermal energy storage—but not in the guise of hot water storage.

Such an alternative form of thermal energy storage is the use of phase-change materials (PCMs). As the name suggests, phase-change materials are materials which exhibit a thermally induced phase change: heating the PCM to its phase transition temperature results in energy being stored as latent (rather than sensible) heat. Many different PCMs are known, the choice for any particular application being dictated by, among other things, the required operating temperature, cost constraints, health and safety restrictions (taking account of toxicity, reactivity, flammability, stability, etc. of the PCM, and the constraints that these impose on such as things as materials needed for containment of the PCM). With an appropriate choice of PCM, a thermal energy storage arrangement can be designed so that energy from a heat pump is available for instantaneous heating of water for a (domestic) hot water system, thereby helping address the slow start problem inherent with the use of a heat pump without the need for a bulky hot water tank.

We will now introduce and describe an energy storage arrangement based on the use of PCMs, and particularly suited for use in installations in which a heat pump is to be used to heat water in a hot water supply. Such an energy storage arrangement may include a heat exchanger comprising an enclosure, and within the enclosure: an input-side circuit for connection to an energy source such as a heat pump, an output-side circuit for connection to an energy sink such as a hot water supply installation, and a phase-change material for the storage of energy.

The input-side circuit receives liquid heated by the heat source, in our case a heat pump, and provided the liquid is hotter than the material inside the heat exchanger, energy is transferred from the liquid into the material within the heat exchanger. Likewise, energy from the material within the heat exchanger is transferred to liquid in the output-side circuit provided the liquid is cooler than the material within the heat exchanger. Of course, if there is no flow through the output-side circuit, the amount of energy transferred out of the heat exchanger is limited, so that most of the input energy remains within the heat exchanger. In our case, the heat exchanger contains a phase-change material, for example, a paraffin wax or a salt-hydrate (examples of suitable materials are discussed later) so that the input energy is largely transferred to the PCM. With an appropriate choice of phase-change material and heat pump operating temperature, it becomes possible to use energy from the heat pump to "charge" the energy "bank" represented by the PCM. Optionally, the energy supply from the heat pump may be supplemented by including one or more electrical heating elements in the heat exchanger, the heating elements being controlled by a processor of the system, and being used, for example, when a low-cost tariff applies to the electricity supply, or for example local or domestic electricity production such as from wind, hydraulic or photovoltaic generation, is able to provide "cheap" energy when there an anticipated or expected future need for hot water.

Phase-change materials for energy storage primarily store energy as latent heat. The phase change between solid and by melting and solidification can store significant quantities of heat, but melting is associated with an increase in volume, often of as much as 10%. This change in volume can give rise to problems with metal enclosures, pipes, and connections etc. suffering fatigue failure with the risk of leaks, loss of efficiency, and possibly worse if the PCM is flammable, toxic, corrosive, or the like. Among other problems that potentially arise in trying to adopt heat pumps as replacements for gas combination boilers, the present disclosure addresses the problem of volume change on phase transition in phase-change materials used for energy storage.

Before addressing the issue of volume change on phase transition in phase-change materials used for energy storage, we will first introduce an energy bank, or energy storage arrangement, that finds particular application as what is effectively an interface unit that sits between a heat pump and an in building hot water system.

FIG. 1 shows schematically an energy bank 10 including a heat exchanger, the energy bank comprising an enclosure 12. Within the enclosure 12 are an input-side circuit 14 of the heat exchanger for connection to an energy source-shown here as a heat pump 16, an output-side circuit 18 of the heat exchanger for connection to an energy sink-shown here as a hot water supply system connected to a cold water feed 21 and including one or more outlets 22. Within the enclosure 12 is a phase-change material for the storage of energy. The energy bank 10 may also include one or more status sensors 24, to provide a measurement of indicative of a status of the PCM. For example, one or more of the status sensors 24 may be a pressure sensor to measure pressure within the enclosure. Preferably the enclosure also includes one or more temperature sensors 26 to measure temperatures within the phase-change material (PCM). If, as is preferred, multiple temperature sensors are provided within the PCM, these are preferably spaced apart from the structure of the input and output circuits of the heat exchanger, and suitably spaced apart within the PCM to obtain a good "picture" of the state of the PCM.

The energy bank 10 has an associated system controller 28 which includes a processor 30. The controller may be integrated into the energy bank 10, but is more typically mounted separately. The controller 28 may also be provided with a user interface module 31, as an integrated or separate unit, or as a unit that may be detachably mounted to a body containing the controller 28. The user interface module 31 typically includes a display panel and keypad, for example in the form of a touch-sensitive display. The user interface module 31, if separate or separable from the controller 28 preferably includes a wireless communication capability to enable the processor 30 of controller 28 and the user interface module to communicate with each other. The user interface module 31 is used to display system status information, messages, advice and warnings to the user, and to receive user input and user commands-such as start and stop instructions, temperature settings, system overrides, etc.

The status sensor(s) 24 is/are coupled to the processor 30, as is/are the temperature sensor(s) 26 if present. The processor 30 is also coupled to a processor/controller 32 in the heat pump 16, either through a wired connection, or wirelessly using associated transceivers 34 and 36, or through both a wired and a wireless connection. In this way, the system controller 28 is able to send instructions, such as a start instruction and a stop instruction, to the controller 32 of the heat pump 16. In the same way, the processor 30 is also able to receive information from the controller 32 of the heat pump 16, such as status updates, temperature information, etc.

The processor 30 of the energy bank can be programmed during manufacture, or subsequently, based on empirical analysis of prototypes, so that the degree of solidification (more generally, the state) of the phase-change material can be mapped to pressure signals from the status transducer 24. For example, preproduction prototypes may be fitted with a glass side panel so that the state of the phase-change material can be determined by inspection/analysis, and the state mapped against pressure signals from the status transducer 24, knowledge of the latent heat of fusion of the phase-change material being used will enable the amount of latent heat stored in the heat exchanger to be calculated for every pressure measured. Data obtained in this way can then be used in programming the processors for production interface unit, and in informing machine learning algorithms in this and potentially other processors in the system.

The hot water supply installation also includes one or more flow sensors 38 which measure flow in the hot water supply system. As shown, such a flow sensor may be provided on the cold water feed 21 to the system, and or between the output of the output-side circuit 18 of the heat exchanger. Optionally, one or more pressure sensors may also be included in the hot water supply system, and again the pressure sensor(s) may be provided upstream of the heat exchanger/energy bank, and/or downstream of the heat exchanger/energy bank—for example alongside one or more of the one or more flow sensors 38. The or each flow sensor, the or each temperature sensor, and the or each pressure sensor is coupled to the processor 30 of the system controller 28 with either or both of a wired or wireless connection, for example using one or more wireless transmitters or transceivers 40. Depending upon the nature(s) of the various sensors 24, 26, and 38, they may also be interrogatable by the processor 30 of the system controller 28.

An electrically controlled thermostatic mixing valve 160 is preferably coupled between the outlet of the energy bank and the one or more outlets of the hot water supply system, and includes a temperature sensor 162 at its outlet. An additional instantaneous water heater, 170, for example an electrical heater (inductive or resistive) controlled by the controller 28, is preferably positioned in the water flow path between the outlet of the energy bank and the mixing valve 160. A further temperature sensor may be provided to measure the temperature of water output by the instantaneous water heater 170, and the measurements provided to the controller 28. The thermostatic mixing valve 160 is also coupled to a cold water supply 180, and is controllable by the controller 28 to mix hot and cold water to achieve a desired supply temperature.

Optionally, as shown, the energy bank 10 may include, within the enclosure 12, an electrical heating element 42 which is controlled by the processor 30 of the system controller 28, and which may on occasion be used as an alternative to the heat pump 16 to recharge the energy bank.

FIG. 1 is merely a schematic, and only shows connection of the heat pump to a hot water supply installation. It will be appreciated that in many parts of the world there is a need for space heating as well as hot water. Typically therefore the heat pump 16 will also be used to provide space heating. An exemplary arrangement in which a heat pump both provides space heating and works with an energy bank for hot water heating will be described later in the application.

Figure 2:
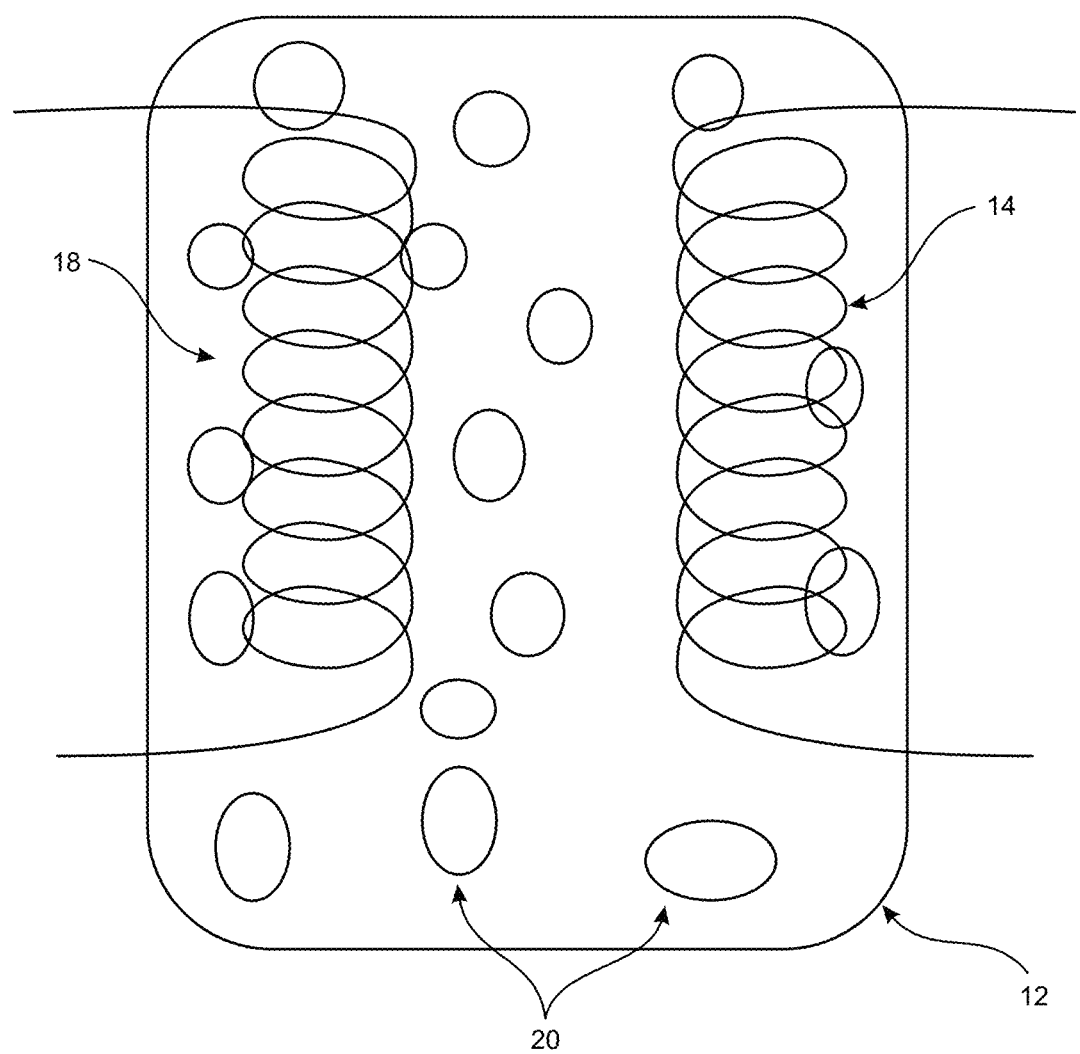
FIG. 2 is a schematic diagram showing arrangements to compensate reversibly for expansion of a phase-change material such as occur with a change of phase from solid to liquid.

The thermal expansion of paraffin wax phase-change materials in the phase change from solid to liquid is around 10% by volume. It is desirable to provide some form of compensation for this change in volume to avoid imposing significant mechanical stresses on the structure of the heat exchanger. One possible way to provide such compensation is to include within the body of phase-change material inclusions which are reversibly compressible. This is illustrated, schematically, in FIG. 2, where inclusions 20 are distributed throughout the mass of phase-change material. It will be appreciated that FIG. 2 has been simplified, for ease of understanding. These inclusions could be, for example, a solid resiliently compressible material such as sponge rubber (either natural or synthetic). Alternatively, the inclusions could be closed hollow bodies, of metal, plastics, or rubber, with an internal pressure low enough to enable them to be compressed by the increase in pressure typically caused by liquefaction of the phase-change material. Thus, the enclosure includes a plurality of resilient bodies that are configured to: reduce in volume in response to an increase in pressure caused by liquefaction of the phase; and expand again in response to a reduction in pressure caused by solidification of the phase-change material.

Figure 3:
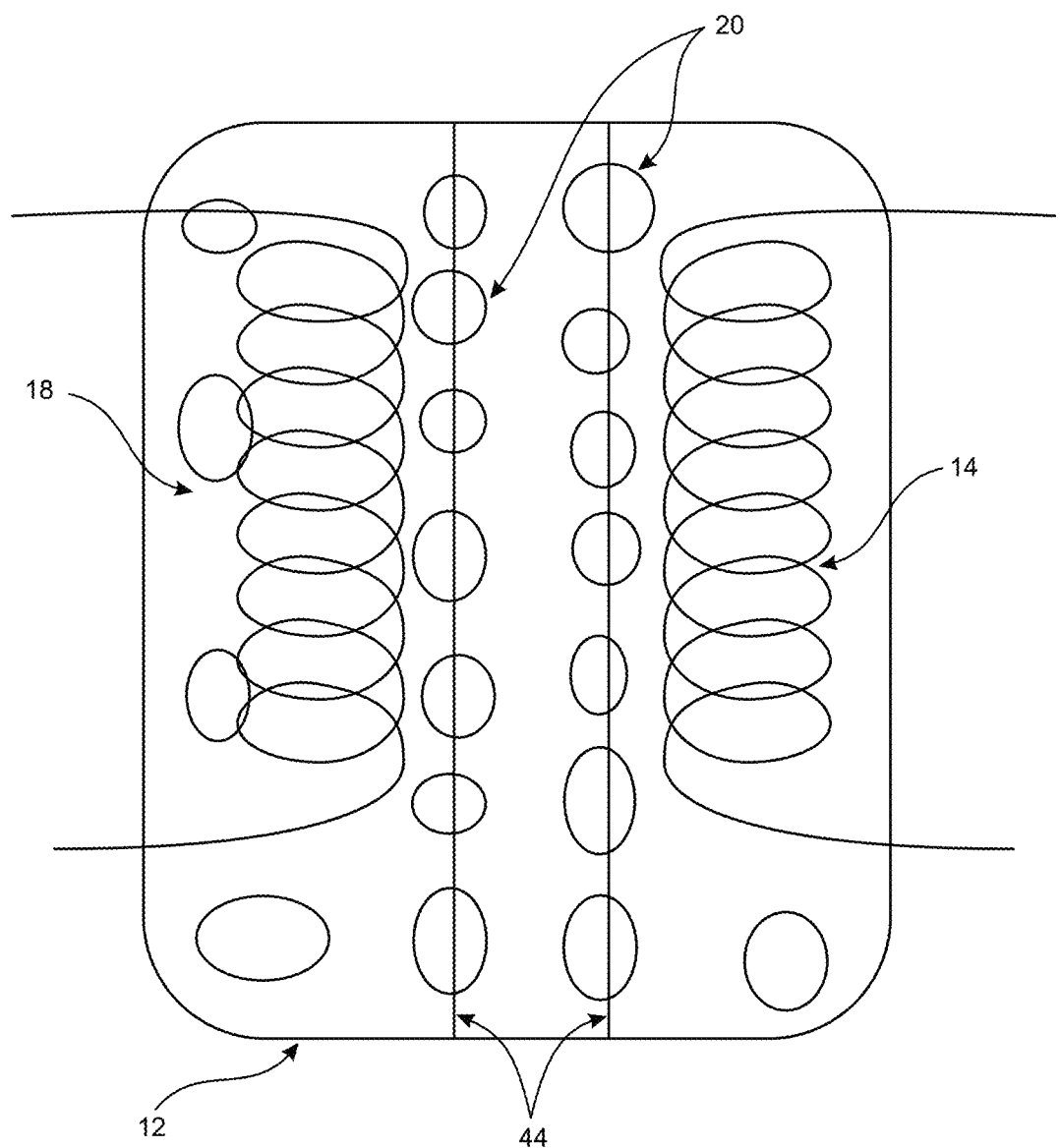
FIG. 3 is a schematic diagram showing an arrangement to compensate reversibly for expansion of a phase-change material such as occur with a change of phase from solid to liquid.

These inclusions could be held in place by the structure of the matrix of the heat exchanger, i.e., the arrangement of pipes and heat transfer protrusions, etc. But it may practically be difficult to ensure that the inclusions don't cluster, aggregate, rise to the top or fall to the bottom of the mass of phase-change material. One way to avoid this, and to ensure that the inclusions 20 stay in place, would be to secure the inclusions to a fixed support structure 44 such as a lattice or framework—as indicated schematically in FIG. 3. Thus, the resilient bodies are coupled to a matrix or lattice structure 44 which serves to restrict displacement of the resilient bodies.

FIG. 1 which shows schematically a potential arrangement of components of an interface unit 10 according to an aspect of the disclosure. The interface unit interfaces between a heat pump (as shown in FIG. 1) and an in-building hot water system. The interface unit includes a heat exchanger 12 comprising an enclosure (not separately numbered) within which is an input-side circuit, shown in very simplified form as 14, for connection to the heat pump, and an output-side circuit, again shown in very simplified form as 16, for connection to the in-building hot water system (not shown in this Figure). The heat exchanger 12 also contains a thermal storage medium for the storage of energy, but this is not shown in the Figure. In the example that will now be described the thermal storage medium is a phase-change material. Throughout this specification, including the claims, references to thermal storage medium, energy storage medium and phase-change material should be considered to be interchangeable unless the context clearly requires otherwise.

Typically, the phase-change material in the heat exchanger has an energy storage capacity (in terms of the amount of energy stored by virtue of the latent heat of fusion) of between 2 and 5 MJoules, although more energy storage is possible and can be useful. And of course less energy storage is also possible, but in general one wants to maximize (subject to practical constraints based on physical dimensions, weight, cost and safety) the potential for energy storage in the phase-change material of the interface unit 10. More will be said about suitable phase-change materials and their properties, and also about dimensions etc. later in this specification.

Figure 4:
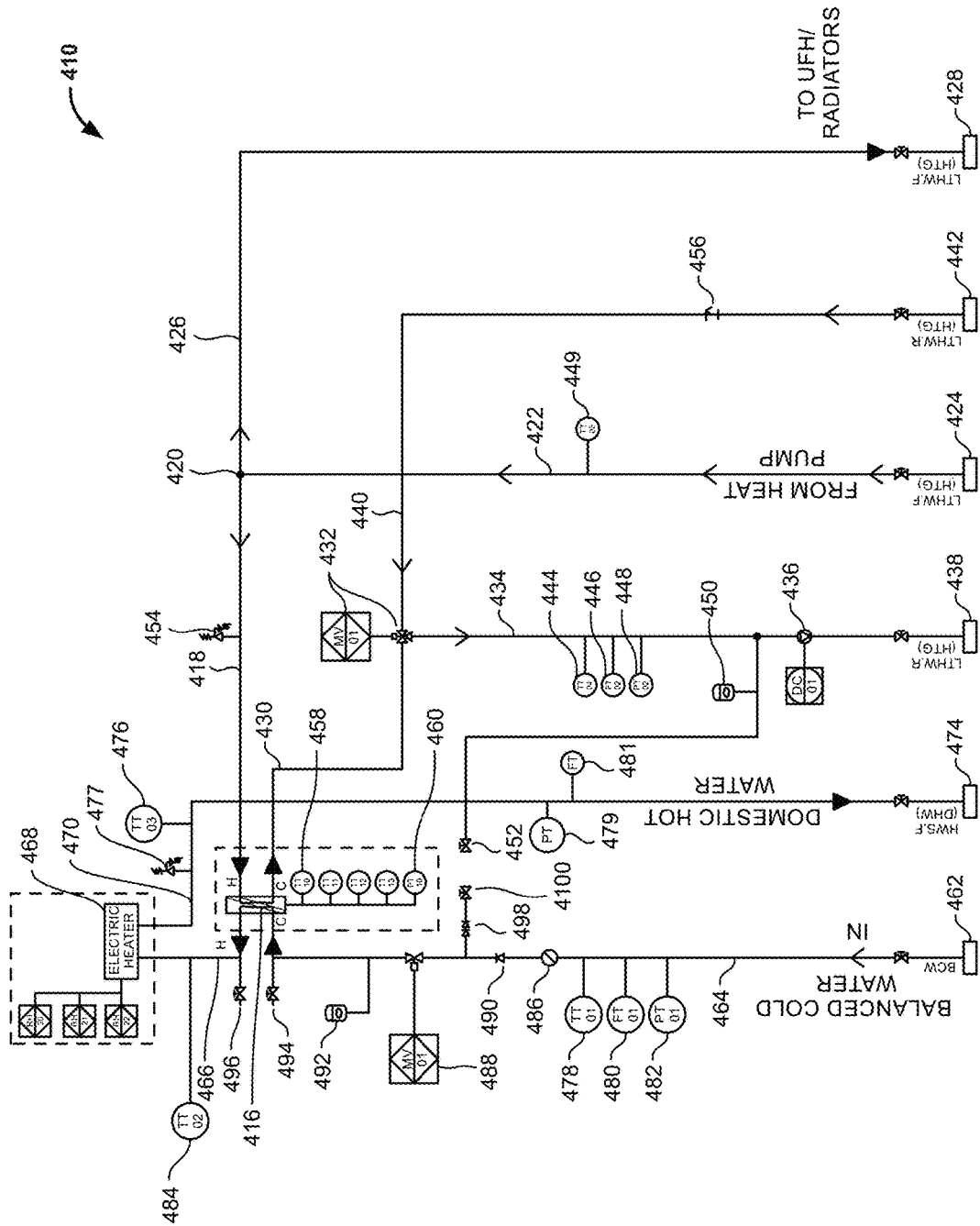
FIG. 4 is a schematic diagram showing a potential arrangement of components of an interface unit according to an aspect of the disclosure.

As shown in FIG. 4, the input side circuit is connected to a pipe or conduit 418 which is in turn fed from node 420, from pipe 422 which has a coupling 424 for connection to a feed from a heat pump. Node 420 also feeds fluid from the heat pump to pipe 426 which terminates in a coupling 428 which is intended for connection to a heating network of a house or flat—for example for plumbing in to underfloor heating or a network of radiators or both. Thus, once the interface unit 410 is fully installed and operational, fluid heated by a heat pump (which is located outside the house or flat) passes through coupling 424 and along pipe 422 to node 420, from where the fluid flow passes along pipe 418 to the input-side circuit of the heat exchanger, or passes along pipe 426 and out through coupling 28 to the heating infrastructure of the house or flat, depending upon the setting of a 3-way valve 432.

Heated fluid from the heat pump flows through the input-side circuit of the heat exchanger and out of the heat exchanger along pipe 430. In use, under some circumstance, heat carried by the heated fluid from the heat pump gives up some of its energy to the phase-change material inside the heat exchanger and some to water in the output-side circuit 16. Under other circumstances, as will be explained later, fluid flowing through the input-side circuit 14 of the heat exchanger actually acquires heat from the phase-change material.

Pipe 430 feeds fluid that leaves the input-side circuit to the motorized 3-port valve 432 and then, depending upon the status of the valve out along pipe 434 to pump 436. Pump 436 serves to push the flow on to the external heat pump via coupling 438.

The motorized 3-port valve 432 also receives fluid from pipe 440 which receives, via coupling 442, fluid returning from the heating infrastructure (e.g., radiators or underfloor heating) of the house or flat.

Between the motorized 3-port valve 432 and the pump 436 a trio of transducers may be provided: a temperature transducer 444, a flow transducer 446, and a pressure transducer 448. In addition, a temperature transducer 449 may be provided in the pipe 422 which brings in fluid from the output of the heat pump. These transducers, like all the others in the interface unit 410, are operatively connected to or addressable by a processor, not shown, which is typically provided as part of the interface unit—but which can be provided in a separate module (as described previously with reference to FIG. 1).

Although not illustrated in FIG. 4, an additional electrical heating element may also be provided in the flow path between the coupler 424, which receives fluid from the output of the heat pump. This additional electrical heating element may again be an inductive or resistive heating element and is provided as a means to compensate for potential failure of the heat pump, but also for possible use in adding energy to the thermal storage unit, for example, based on the current energy cost and predicted for heating and/or hot water. The additional electrical heating element is also controllable by the processor of the system.

Also coupled to pipe 434 is an expansion vessel 450, to which is connected a valve 452 by means of which a filling loop may be connected to top up fluid in the heating circuit. Also shown as part of the heating circuit of the interface unit are a pressure relief valve 454, intermediate the node 420 and the input-side circuit, and a strainer 456 (to capture particulate contaminants) which may be provided intermediate the coupling 442 and the 3-port valve 432.

The heat exchanger 12 is also preferably provided with several transducers, including at least one temperature transducer 458, although more (e.g., up to 4 or more) are preferable provided, as shown, and a pressure transducer 460. In the example shown, the heat exchanger includes 4 temperature transducers uniformly distributed within the phase-change material so that temperature variations can be determined (and hence knowledge obtained about the state of the phase-change material throughout its bulk). Such an arrangement may be of particular benefit during the design/implementation phase as a means to optimize design of the heat exchanger-including in optimizing addition heat transfer arrangements. But such an arrangement may also continue to be of benefit in deployed systems as having multiple sensors can provide useful information to the processor and a machine learning algorithms optionally employed by the processor (either of just the interface unit, and/or of a processor of a system including the interface unit).

The arrangement of the cold water feed and the hot water circuit of the interface unit 410 will now be described. A coupling 462 is provided for connection to a cold feed from for example a water main. Typically, before water from the water main reaches the interface unit 410, the water will have passed through an anti-syphon non-return valve and may have had its pressure reduced. From coupling 462 cold water passes along pipe to the output-side circuit 416 of the heat exchanger. Given that we provide a processor that is monitoring numerous sensors in the interface unit, the same processor can optionally be given another task to do. That is to monitor the pressure at which cold water is delivered from the mains water supply. To this end, a further pressure sensor can be introduced in to the cold water supply line upstream of coupling 462, and in particular upstream of any pressure reducing arrangement within the premises. The processor can then continually or periodically monitor the supplied water pressure, and even prompt the owner/user to seek compensation from the water supply company if the water main supplies water at a pressure below the statutory minimum.

From the output-side circuit 416 water, which may have been heated by its passage through the heat exchanger, passes along a pipe 466 to an electrical heating unit 468. The electrical heating unit 468, which is under the control of the processor mentioned previously, may comprise for example a resistive or inductive heating arrangement whose heat output can be modulated in accordance with instructions from the processor.

The processor is configured to control the electrical heater, based on information about the status of the phase-change material and of the heat pump.

Typically, the electrical heating unit 468 has a power rating of no more than 10 KW, although under some circumstances a more powerful heater, e.g., 12 kW, may be provided.

From the electric heater 468, what will by now hot water passes along a pipe 470 to a coupling 474 to which the hot water circuit, including controllable outlets such as taps and showers, of the house or flat will be connected.

A temperature transducer 476 is provided after the electric heater 68, for example at the outlet of the electric heater 468 to provide information on the water temperature at the outlet of the hot water system. A pressure relief valve 477 is also provided in the hot water supply, and while this is shown as being located between the electric heater 468 and the outlet temperature transducer 476, its precise location is unimportant—as indeed is the case for many of the components illustrated in FIG. 4.

Also somewhere in the hot water supply line is a pressure transducer 479 and or a flow transducer 481 either of which can be used by the processor to detect a call for hot water—i.e., detect the opening of a controllable outlet such as a tap or shower. The flow transducer is preferably one which is free from moving parts, for example based on sonic flow detection or magnetic flow detection. The processor can then use information from one or both of these transducers, along with its stored logic, to decide whether to signal to the heat pump to start.

It will be appreciated that the processor can call on the heat pump to start either based on demand for space heating (e.g., based on a stored program either in the processor or in an external controller, and/or based on signals from one or more thermostats—e.g., room stats, external stats, underfloor heating stats) or demand for hot water. Control of the heat pump may be in the form of simple on/off commands, but may also or alternatively be in the form of modulation (using, for example, a ModBus).

As is the case with the heating circuit of the interface unit, a trio of transducers are provided along the cold water feed pipe 464: a temperature transducer 478, a flow transducer 480, and a pressure transducer 482. Another temperature transducer 484 is also provided in pipe 466 intermediate the outlet of the output-side circuit 416 of the heat exchanger and the electric heater 468. These transducers are again all operatively connected to or addressable by the processor mentioned previously. Additionally, or alternatively, an electrically controlled thermostatic mixing valve may be provided intermediate the electric heater 468 and the taps or other outlets of the hot water system, preferably between the heater 468 and coupling 474, under control of the processor (e.g., 30 of controller 28 from FIG. 1), to enable the controller 28 to regulate the hot water supply temperature by mixing hot water from the heat exchanger with cold water, the mixing valve preferably including a temperature sensor, coupled to the controller 28, to detect the temperature of water output by the valve.

Also shown on the cold water supply line 464 are a magnetic or electrical water conditioner 486, a motorized and modulatable valve 488 (which like all the motorized valves may be controlled by the processor mentioned previously), a non-return valve 490, and an expansion vessel 492. The modulatable valve 488 can be controlled to regulate the flow of cold water to maintain a desired temperature of hot water (measured for example by temperature transducer 476).

Valves 494 and 496 are also provided for connection to external storage tanks for the storage of cold and heated water respectively. Optionally, at least the valve 496 may be used to recirculate hot water in the premises to reduce the hot water supply time, although this functionality might involve a higher energy usage—so that the functionality should be used with care. Finally, a double check valve 498 connects cold feed pipe 464 to another valve 4100 which can be used with a filling loop to connect to previously mentioned valve 452 for charging the heating circuit with more water or a mix of water and corrosion inhibitor.

It should be noted that FIG. 4 shows various of the pipes crossing, but unless these crossing are shown as nodes, like node 420, the two pipes that are shown as cross do not communicate with each other, as should by now be clear from the foregoing description of the Figure.

Although not shown in FIG. 4, the heat exchanger 12 may include one or more additional electrical heating elements configured to put heat into the thermal storage medium. While this may seem counter intuitive, it permits the use of electrical energy to pre-charge the thermal storage medium at times when it makes economic sense to do so, as will now be explained.

It has long been the practice of energy supply companies to have tariffs where the cost of a unit of electricity varies according to the time of day, to take account of times of increased or reduced demand and to help shape customer behavior to better balance demand to supply capacity. Historically, tariff plans were rather coarse reflecting the technology both of power generation and of consumption. But increasing incorporation of renewable energy sources of electrical power-such as solar power (e.g., from photovoltaic cells, panels, and farms) and wind power, into the power generation fabric of countries has spurred the development of a more dynamic pricing of energy. This approach reflects the variability inherent in such weather-dependent power generation. Initially such dynamic pricing was largely restricted to large scale users, increasingly dynamic pricing is being offered to domestic consumers.

The degree of dynamism of the pricing varies from country to country, and also between different producers within a given country. At one extreme, "dynamic" pricing is little more than the offering of different tariffs in different time windows over the day, and such tariffs may apply for weeks, months, or seasons without variation. But some dynamic pricing regimes enable the supplier to change prices with a day's notice or less-so for example, customers may be offered today prices for half-hour slots tomorrow. Time slots of as short as 6 minutes are offered in some countries, and conceivably the lead time for notifying consumers of forthcoming tariffs can be reduced further by including "intelligence" in energy-consuming equipment.

Because it is possible to use short and medium term weather predictions to predict both the amount of energy likely to be produced by solar and wind installations, and the likely scale of power demand for heating and cooling, it becomes possible to predict periods of extremes of demand. Some power generation companies with significant renewable generation capacity have even been known to offer negative charging for electricity-literally paying customers to use the excess power. More often, power may be offered at a small fraction of the usual rate.

By incorporating an electric heater into an energy storage unit, such as a heat exchanger of systems according to the disclosure, it becomes possible for consumers to take advantage of periods of low cost supply and to reduce their reliance on electrical power at times of high energy prices. This not only benefits the individual consumer, but it is also beneficial more generally as it can reduce demand at times when excess demand must be met by burning fossil fuels.

The processor of the interface unit has a wired or wireless connection (or both) to a data network, such as the Internet, to enable the processor to receive dynamic pricing information from energy suppliers. The processor also preferably has a data link connection (e.g., a ModBus) to the heat pump, both to send instructions to the heat pump and to receive information (e.g., status information and temperature information) from the heat pump. The processor has logic which enables it to learn the behavior of the household, and with this and the dynamic pricing information, the processor is able to determine whether and when to use cheaper electricity to pre-charge the heating system. This may be by heating the energy storage medium using an electrical element inside the heat exchanger, but alternatively this can be by driving the heat pump to a higher than normal temperature—for example 60 Celsius rather than between 40 and 48 Celsius. The efficiency of the heat pump reduce when it operates at higher temperature, but this can be taken into account by the processor in deciding when and how best to use cheaper electricity.

Because the system processor is connectable to a data network, such as the Internet and/or a provider's intranet, the local system processor can benefit from external computing power. So, for example the manufacturer of the interface unit is likely to have a cloud presence (or intranet) where computing power is provided for calculations of, for example, predicted: occupancy; activity; tariff (short/long); weather forecasts (which may be preferable to generally available weather forecasts because they can be pre-processed for easy use by the local processor, and they may also be tailored very specifically to the situation, location, exposure of the property within which the interface unit is installed); identification of false positives and/or false negatives.

To protect users from the risk of scalding by overheated water from the hot water supply system it is sensible to provide a scalding protection feature. This may take the form of providing an electrically controllable (modulatable) valve to mix cold water from the cold water supply into hot water as it leaves the output circuit of the heat exchanger (the extra valve can be mounted between the nodes to which existing valves 94 and 96 previously mentioned).

FIG. 4 shows schematically what might be considered the "guts" of the interface unit, but does not show any container for these "guts". An important application of interface units according to the disclosure is as a means to enable a heat pump to be used as a practical contributor to the space heating and hot water requirements of a dwelling that was previously provide with a gas-fired combination boiler (or which might otherwise have such a boiler installed), it will be appreciated that it will often be convenient both to provide a container both for aesthetics and safety, just as is the case conventionally with combi boilers. Moreover, preferably any such container will be dimensioned to fit within a form factor enabling direct replacement of a combi boiler-which are typically wall mounted, often in a kitchen where they co-exist with kitchen cabinets. Based on the form of a generally rectangular cuboid (although of course, for aesthetics, ergonomics, or safety, curved surfaces may be used for any or all of the surfaces of the container) with a height, width and depth, suitable sizes may be found in the approximate ranges: height 650 mm to 800 mm; width 350 mm to 550 mm; depth 260 mm to 420 mm; for example 800 mm high, by 500 mm wide, and 400 mm deep. Although of course larger, and in particular taller units, may also be provided for use in installations where these can readily be accommodated.

One notable distinction of interface units according to the disclosure with respect to gas combi boilers is that while the containers of the latter generally have to be made of non-combustible materials-such as steel, due to the presence of a hot combustion chamber, the internal temperatures of an interface unit will generally be considerably less than 100 Celsius, typically less than 70 Celsius, and commonly less than 60 Celsius. So it becomes practical to use less fire-resistant materials such a wood, bamboo, or even paper, in fabricating a container for the interface unit.

The lack of combustion also opens up the possibility to install interface units in locations that would generally never be considered as suitable for the installation of gas combi boilers—and of course, unlike a gas combi boiler, interface units according to the disclosure, do not require a flue for exhaust gases. So, for example, it becomes possible to configure an interface unit for installation beneath a kitchen worktop, and even to make use of the notorious dead spot represented by an under counter corner. For installation in such a location the interface unit could actually be integrated into an under counter cupboard-preferably through a collaboration with a manufacturer of kitchen cabinets. But greatest flexibility for deployment would be retained by having an interface unit that effectively sits behind some form of cabinet, the cabinet being configured to allow access to the interface unit. The interface unit would then preferably be configured to permit the circulation pump 36 to be slid out and away from the heat exchanger 12 before the circulation pump 36 is decoupled from the flow path of the input-side circuit.

Consideration can also be given to taking advantage of other space frequently wasted in fitted kitchens, namely the space beneath under-counter cupboards. There is often more a space with a height of more than 150 mm, and a depth of around 600 mm, with widths of 300, 400, 500, 600 mm or more (although allowance needs to be made for any legs supporting the cabinets). For new installations in particular, or where a combi boiler is being replaced along with a kitchen refit, it makes sense to use these spaces at least to accommodate the heat exchanger of the interface unit—or to use more than one heat exchanger unit for a given interface unit.

Particularly for interface units designed for wall mounting, although potentially beneficial whatever the application of the interface unit, it will often be desirable to design the interface unit as a plurality of modules. With such designs it can be convenient to have the heat exchanger as one of the of modules, because the presence of the phase-change material can result in the heat exchanger alone weighing more than 25 kg. For reasons of health and safety, and in order to facilitate one-person installation, it would be desirable to ensure that an interface unit can be delivered as a set of modules none of which weighs more than about 25 kg.

Such a weight constraint can be supported by making one of the modules a chassis for mounting the interface unit to a structure. For example, where an interface unit is to be wall mounted in place of an existing gas combi boiler, it can be convenient if a chassis, by which the other modules are supported, can first be fixed to the wall. Preferably the chassis is designed to work with the positions of existing fixing points used to support the combi boiler that is being replaced. This could potentially be done by providing a "universal" chassis that has fixing holes preformed according to the spacings and positions of popular gas combi boilers. Alternatively, it could be cost effective to produce a range of chassis each having hole positions/sizes/spacings to match those of particular manufacturer's boilers. Then one just needs to specify the right chassis to replace the relevant manufacturer's boiler. There are multiple benefits to this approach: it avoids the need to drill more holes for plugs to take fixing bolts—and not only does this eliminate the time needed to mark out, drill the holes and clean up, but it avoids the need to further weaken the structure of the dwelling where installation is taking place-which can be an important consideration given the low cost construction techniques and materials frequently used in "starter homes" and other low cost housing.

Preferably the heat exchanger module and the chassis module are configured to couple together. In this way it may be possible to avoid the need for separable fastenings, again saving installation time.

Preferably an additional module includes first interconnects, e.g., 62 and 74, to couple the output side circuit 16 of the heat exchanger 12 to the in-building hot water system. Preferably the additional module also includes second interconnects, e.g., 38 and 24, to couple the input side circuit 14 of the heat exchanger 12 to the heat pump. Preferably the additional module also includes third interconnects, e.g., 42 and 28, to couple the interface unit to the heat circuit of the premises where the interface unit is to be used. It will be appreciated that by mounting heat exchanger to the chassis which is itself directly connected to the wall, rather than first mounting the connections to the chassis, the weight of the heat exchanger is kept closer to the wall, reducing the cantilever loading effect on the wall fixings that secure the interface unit to the wall.

Phase-Change Materials

One suitable class of phase-change materials are paraffin waxes which have a solid-liquid phase change at temperatures of interest for domestic hot water supplies and for use in combination with heat pumps. Of particular interest are paraffin waxes that melt at temperatures in the range 40 to 60 Celsius, and within this range waxes can be found that melt at different temperatures to suit specific applications. Typical latent heat capacity is between about 180 KJ/kg and 230 KJ/kg and a specific heat of perhaps 2.27 $Jg^{-1}K^{-1}$ in the liquid phase, and 2.1 $Jg^{-1}K^{-1}$ in the solid phase. It can be seen that very considerable amounts of energy can be stored taking using the latent heat of fusion. More energy can also be stored by heating the phase change liquid above its melting point. For example, when electricity costs are relatively low and it can be predicted that there will shortly be a need for hot water (at a time when electricity is likely to, or known to be going to, cost more perhaps), then it can make sense to run the heat pump at a higher than normal temperature to "overheat" the thermal energy store.

A suitable choice of wax may be one with a melting point at around 48 Celsius, such as n-tricosane $C_{23}$, or paraffin $C_{20}$-$C_{33}$. Applying the standard 3K temperature difference across the heat exchanger (between the liquid supplied by the heat pump and the phase-change material in the heat exchanger) gives a heat pump liquid temperature of around 51 Celsius. And similarly on the output side, allowing a 3K temperature drop, we arrive at a water temperature of 45 Celsius which is satisfactory for general domestic hot water—hot enough for kitchen taps, but potentially a little high for shower/bathroom taps—but obviously cold water can always be added to a flow to reduce water temperature. Of course, if the household are trained to accept lower hot water temperatures, or if they are acceptable for some other reason, then potentially a phase-change material with a lower melting point may be considered, but generally a phase transition temperature in the range 45 to 50 is likely to be a good choice. Obviously we will want to take into account the risk of Legionella from storing water at such a temperature.

Heat pumps (for example ground source or air source heat pumps) have operating temperatures of up to 60 Celsius (although by using propane as a refrigerant, operating temperatures of up to 72 Celsius are possible), but their efficiencies tend to be much higher when run at temperatures in the range of 45 to 50 Celsius. So our 51 Celsius, from a phase transition temperature of 48 Celsius is likely to be satisfactory.

Consideration also needs to be given to the temperature performance of the heat pump. Generally, the maximum ΔT (the difference between the input and output temperature of the fluid heated by the heat pump) is preferably kept in the range of 5 to 7 Celsius, although it can be as high as 10 Celsius.

Although paraffin waxes are a preferred material for use as the energy storage medium, they are not the only suitable materials. Salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3 \cdot 5H_2O$, which has a melting point around 48 to 49 Celsius, and latent heat of 200/220 KJ/kg.

In terms simply of energy storage, consideration can also be given to using PCMs with phase transition temperatures that are significantly above the 40-50 Celsius range. For example, a paraffin wax, waxes being available with a wide range of melting points:

n-henicosane $C_{24}$ which has a melting point around 40 Celsius;

n-docosane $C_{21}$ which has a melting point around 44.5 Celsius;

n-tetracosane $C_{23}$ which has a melting point around 52 Celsius;

n-pentacosane $C_{25}$ which has a melting point around 54 Celsius;

n-hexacosane $C_{26}$ which has a melting point around 56.5 Celsius;

n-heptacosane $C_{27}$ which has a melting point around 59 Celsius;

n-octacosane $C_{28}$ which has a melting point around 64.5 Celsius;

n-nonacosane $C_{29}$ which has a melting point around 65 Celsius;

n-triacosane $C_{30}$ which has a melting point around 66 Celsius;

n-hentriacosane $C_{33}$ which has a melting point around 67 Celsius;

n-dotriacosane $C_{32}$ which has a melting point around 69 Celsius;

n-triatriacosane $C_{33}$ which has a melting point around 71 Celsius;

paraffin $C_{22}$-$C_{45}$ which has a melting point around 58 to 60 Celsius;

paraffin $C_{21}$-$C_{50}$ which has a melting point around 66 to 68 Celsius;

RT 70 HC which has a melting point around 69 to 71 Celsius.

Alternatively, a salt hydrate such as $CH_3COONa \cdot 3H_2O$—which has a melting point around 58 Celsius, and latent heat of 226/265 KJ/kg may be used.

Thus far, the thermal energy store has largely been described as having a single mass of phase-change material within a heat exchanger that has input and output circuits each in the form of one or more coils or loops. But it may also be beneficial in terms of rate of heat transfer for example, to encapsulate the phase-change material in a plurality of sealed bodies—for example in metal (e.g., copper or copper alloy) cylinders (or other elongate forms)—which are surrounded by a heat transfer liquid from which the output circuit (which is preferably used to provide hot water for a (domestic) hot water system) extracts heat.

With such a configuration the heat transfer liquid may either be sealed in the heat exchanger or, more preferably, the heat transfer liquid may flow through the energy store and may be the heat transfer liquid that transfers heat from the green energy source (e.g., a heat pump) without the use of an input heat transfer coil in the energy store. In this way, the input circuit may be provided simply by one (or more generally multiple) inlets and one or more outlets, so that heat transfer liquid passes freely through the heat exchanger, without being confined by a coil or other regular conduit, the heat transfer liquid transferring heat to or from the encapsulated PCM and then on to the output circuit (and thus to water in the output circuit). In this way, the input circuit is defined by the one or more inlets and the one or more out for the heat transfer liquid, and the freeform path(s) past the encapsulated PCM and through the energy store.

Preferably the PCM is encapsulated in multiple elongate closed-ended pipes arranged in one or more spaced arrangements (such as staggered rows of pipes, each row comprising a plurality of spaced apart pipes) with the heat transfer fluid preferably arranged to flow laterally (or transverse to the length of the pipe or other encapsulating enclosure) over the pipes—either on route from the inlets to the outlets or, if an input coil is used, as directed by one or more impellers provided within the thermal energy store.

Optionally, the output circuit may be arranged to be at the top of the energy store and positioned over and above the encapsulated PCM—the containers of which may be disposed horizontally and either above an input loop or coil (so that convection supports energy transfer upwards through the energy store) or with inlets direction incoming heat transfer liquid against the encapsulated PCM and optionally towards the output circuit above. If one or more impellers is used, preferably the or each impeller is magnetically coupled to an externally mounted motor-so that the integrity of the enclosure of the energy store is not compromised.

Optionally the PCM may be encapsulated in elongate tubes, typically of circular cross section, with nominal external diameters in the range of 20 to 67 mm, for example 22 mm, 28 mm, 35 mm, 42 mm, 54 mm, or 67 mm, and typically these tubes will be formed of a copper suitable for plumbing use. Preferably, the pipes are between 22 mm and 54 mm, for example between 28 mm and 42 mm external diameter.

The heat transfer liquid is preferably water or a water-based liquid such as water mixed with one or more of a flow additive, a corrosion inhibitor, an anti-freeze, a biocide, —and may for example comprise an inhibitor of the type designed for use in central heating systems—such as Sentinel X100 or Fernox F1 (both RTM)—suitably diluted in water.

Thus, throughout the description and claims of the present application the expression input circuit should be construed, unless the context clearly requires otherwise, to include an arrangement as just described and in which the path of liquid flow from the input of the input circuit to its output is not defined by a regular conduit but rather involves the liquid flowing substantially freely within the enclosure of the energy store.

Figure 6A:
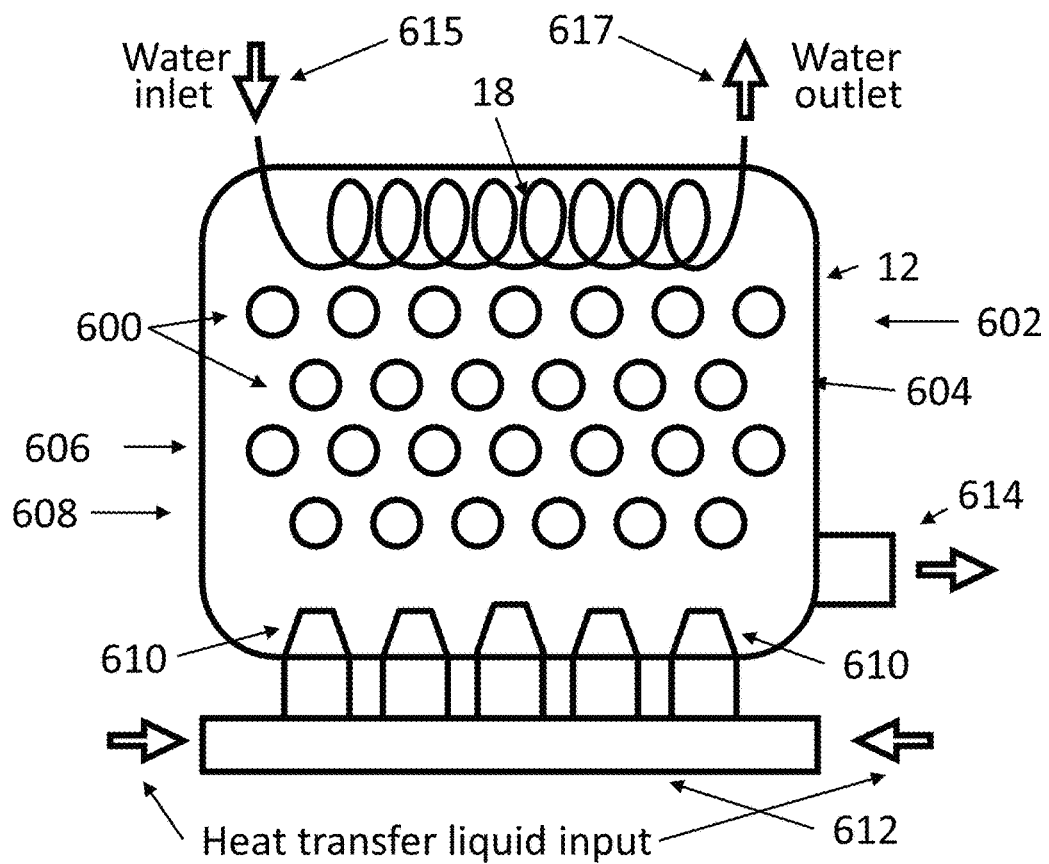
FIG. 6A is a schematic diagram illustrating the use of encapsulated phase-change materials together with an alternative form of input circuit.
Figure 6B:
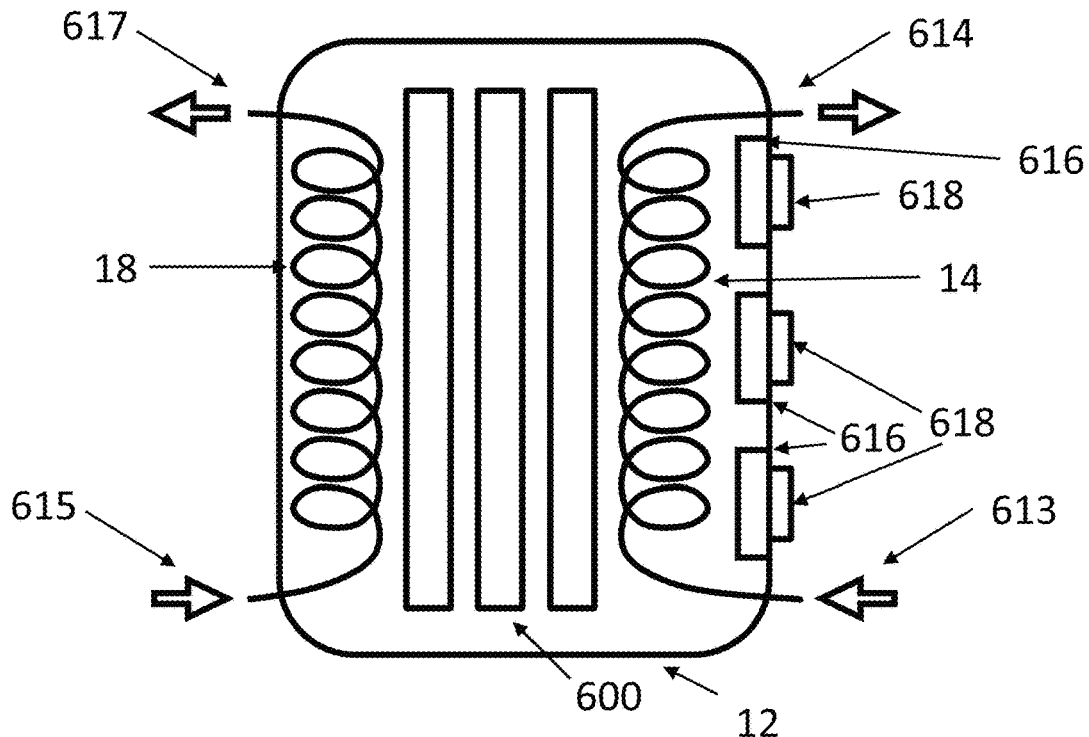
FIG. 6B is a schematic diagram illustrating the use of encapsulated phase-change materials together with another form of input circuit.

FIGS. 6A and 6B illustrate schematically the internal structure of energy stores 12 which use PCM encapsulation, and notably illustrate two alternative input circuit arrangements for use with PCM encapsulation. In FIG. 6A the PCM is encapsulated in a plurality of elongate cylinders 600 of circular or generally circular cross section, the cylinders preferably being arranged spaced apart in one or more rows 602, 604, 606, and 608. Preferably the cylinders in adjacent rows are offset with respect to each other to facilitate heat transfer from and to the heat transfer liquid. FIG. 6A illustrates an input arrangement in which heat transfer liquid is introduced to the space about the encapsulating bodies by one or more input ports-here shown as a plurality of input nozzles 610 (or a water inlet 613 as shown in FIG. 6B), that direct the input heat transfer liquid towards and onto the encapsulating bodies fed by an input manifold 612. The bores of the nozzles at their outputs may be generally circular in section or may be elongate to produce a jet or stream of liquid that more effectively transfers heat to the encapsulated PCM. The manifold may be fed from a single end or, as shown, from opposed ends with a view to increasing the flow rate and reducing pressure loss.

The heat transfer liquid may be pumped into the energy store 12 as the result of action of a pump of the green energy source (e.g., a heat pump or solar hot water system), or of another system pump, or the thermal energy store may include its own pump. After emerging from the energy store at one or more outlets 614 of the input circuit 14 the heat transfer liquid may pass directly back to the energy source (e.g., the heat pump) or may be switchable, through the use of one or more valves, to pass first to a heating installation (e.g., underfloor heating, radiators, or some other form of space heating) before returning to the green energy source.

In FIG. 6A the encapsulating bodies 600 are shown as disposed horizontally-here being viewed end on, and the coil of the output circuit is here positioned above and over the encapsulating bodies 600. It will be appreciated that this is merely one of many possible arrangements and orientations. The same arrangement could equally well be positioned with the encapsulating bodies 600 arranged vertically (so that FIG. 6A would become a top-down or bottom-up view rather than a sideways view).

FIG. 6B illustrates the internal structure of an energy store using PCM encapsulation, again with the use of cylindrical elongate encapsulation bodies 600—such as those previously described, but in this case with an input circuit in the form of conduit—here in the form of a coil. FIG. 6B is a side view showing the encapsulation bodies 600 with their long axes disposed vertically, and the input 14 and output 18 coils disposed to either side of the energy store 12. But as with the arrangement of FIG. 6A, the FIG. 6B arrangement could also be used in an alternative orientation, such as with the input circuit at the bottom and the output circuit at the top, and the encapsulation bodies with their long axes disposed horizontally. The Figure also illustrates the use of one or more impellers 616 that are arranged within the energy store 12 to propel energy transfer liquid from around the input coil 14 towards the encapsulation bodies 600. The or each impeller is preferably coupled via a magnetic drive system to an externally mounted drive unit 608 (for example an electric motor) so that the enclosure of the energy store 12 does not need to be perforated to accept a drive shaft-thereby reducing the risk of leaks where such shafts enter the enclosure. In both FIG. 6A and FIG. 6B the water to be heated by the energy store 12 is fed in at water inlet 615 and taken out at water outlet 617 after passing through the output coil 18.

By virtue of the fact that the PCM is encapsulated it becomes readily possible to construct an energy store that uses more than one phase-change material for energy storage, and in particular permits the creation of an energy storage unit in which PCMs with different transition (e.g., melting) temperatures can be combined thereby extending the operating temperature of the energy store.

It will be appreciated that in embodiments of the type illustrated schematically in FIGS. 6A and 6B the energy store 12 contains one or more phase-change materials to store energy as latent heat in combination with a heat transfer liquid (such as water or a water/inhibitor solution).

It will also be appreciated that a plurality of resilient bodies that are configured to reduce in volume in response to an increase in pressure caused by a phase change of the phase-change material and to expand again in response to a reduction in pressure caused by a reverse phase change of the phase-change material are preferably provided with the phase-change material within the encapsulation bodies.

Figure 5A:
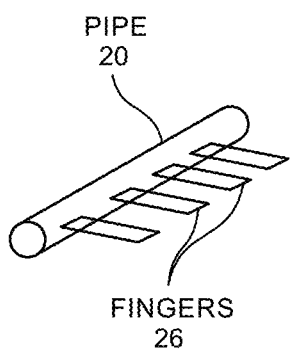
FIGS. 5A-5F are is a schematic diagrams showing different arrangements to improve heat transfer within an energy storage arrangement that includes a heat exchanger.
Figure 5B:
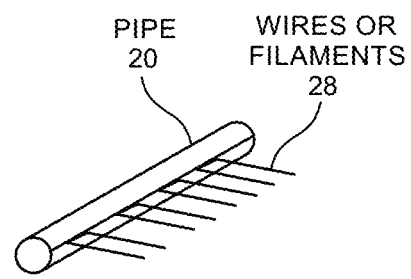
Figure 5C:
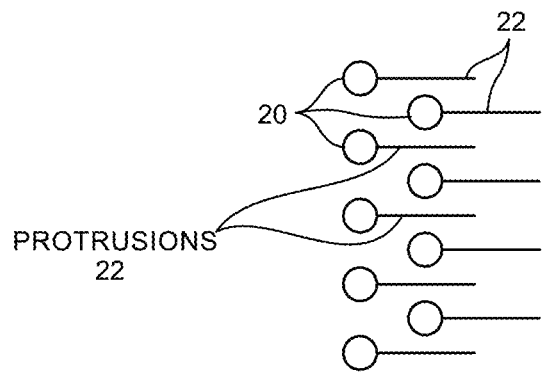
Figure 5D:
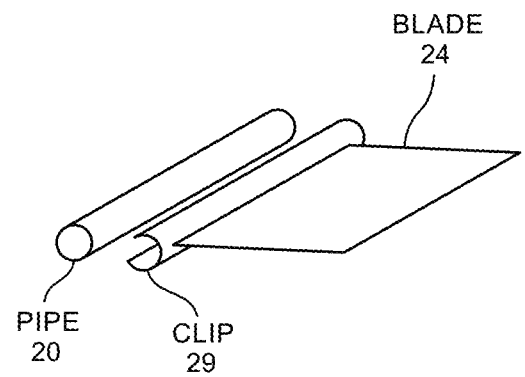

Metal foams, for example of aluminum, aluminum alloys or copper, may be used to improve the heat transfer properties of the thermal storage material-notably when paraffin wax is used as the thermal storage material. Alternatively, as shown schematically in FIG. 5A, the heat transfer pipes 20 of the output circuit (and the input circuit if in the form of a pipe or conduit) of the heat exchanger may be provided with protrusions 22 (see FIG. 5C)—blades 24 see FIG. 5D), fingers 26 (see FIG. 5A), wires or filaments 28 see FIG. 5B), formed of a material with a high thermal conductivity—such as copper, a copper alloy, or carbon fiber, which extend into the mass of thermal storage material (e.g., wax) to effectively improve energy transfer from the fluid in the input circuit into the thermal storage mass, throughout the thermal storage mass, and from the thermal storage mass into the water in the output circuit of the heat exchanger. It can be seen here that the input-side and output-side circuit within the enclosure of the heat exchanger are defined by tubular bodies, and filamentary protrusions may be provided extending into the phase-change material from each of the tubular bodies, wherein the filamentary protrusions have higher conductivity than the phase-change material.

For example, copper wires 28 (see FIG. 5B) or copper blades 24 (see FIG. 5D) or fingers 26 (see FIG. 5A) can be directly attached, e.g., by welding, to the copper pipes 20 (a preferred choice of material for the circuits of the heat exchanger giving the preponderance of copper usage in domestic heating and water systems: for installations that use aluminum alloy pipework and radiant bodies, it may be preferred, for electrochemical reasons, to also make the heat exchanger input and output circuits and protrusions 22 from aluminum or an alloy thereof) that provide the input and output circuits, a free end of each of the protrusions 22 extending away from the pipe 20 to which it is attached. Alternatively, each heat transfer blade 24, or possibly multiple heat transfer wires 28 or finger 26 could be attached to a sprung clip 29 (e.g., of phosphor bronze) which is clipped over and thereby secured to a pipe of one or other of the input and output circuits of the heat exchanger.

Figure 5E:
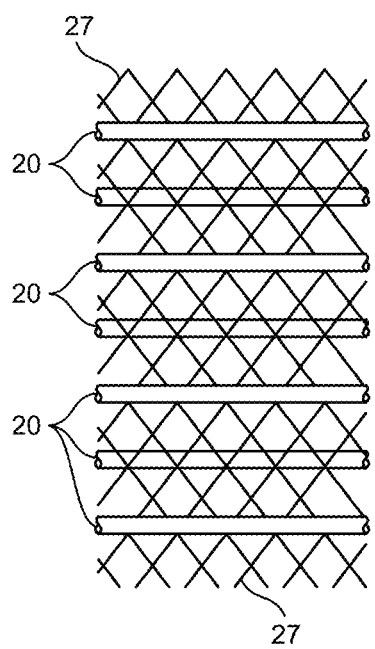
Figure 5F:
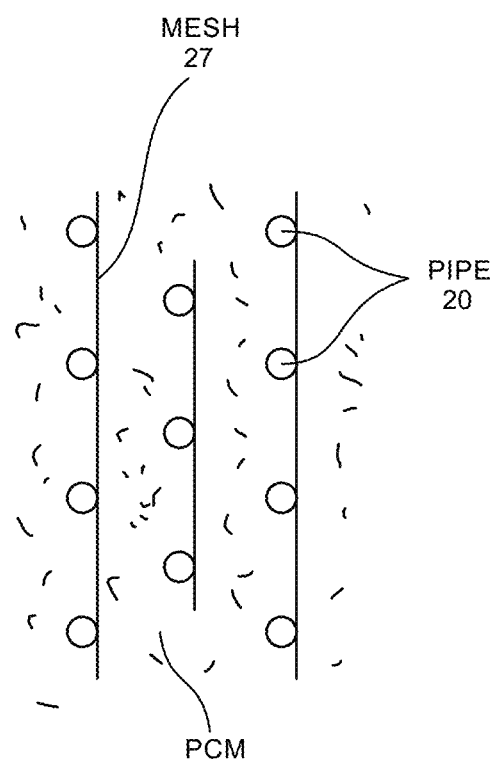

Alternatively, as also shown in FIGS. 5E and 5F, the pipes that define the input circuit of the heat exchanger may be secured to a heat transfer mesh 27. For example, the filamentary protrusions may together form one or more meshes.

An energy storage arrangement as previously described finds particular, but not exclusive application in what may be termed "an interface unit" that provides an interface between a heat pump, notably a heat pump installed outside a dwelling or other building, and a hot water distribution installation of such a dwelling or building. Such an interface unit may be designed and configured to take the place of an existing or potential gas combi boiler installation. Such an interface unit not only provides a means by which energy from liquid heated by the heat pump can be transferred to water of the hot water installation, but also provides an energy storage function through the inclusion of a phase-change material (PCM). Energy from the heat pump may be used to heat the PCM to a phase change temperature at which energy is stored as latent heat (rather than simply as sensible heat—although heating the PCM beyond the phase change temperature also leads to energy being stored as sensible heat).

It will be appreciated that the energy storage unit stores energy as latent heat, but can also store heat in the form of sensible heat, as is the case when the phase-change material is heated to above the phase change temperature, for example if the PCM is a paraffin wax, the PCM can be heated to the phase change temperature, at which it will eventually melt, and then further heat input will take the temperature of the wax above the melting point. But in any event, during use of the energy storage unit it will be at a temperature of the water in the hot water system-so in the region of around 40 to 60 Celsius. As such, in order to avoid wasting energy, it is sensible to provide the energy storage unit with thermal insulation. The choice of insulation depends upon the environment, and in particular on the temperature gradient across the insulation, the available space, and also on cost.

Another method of monitoring the state of the phase-change material which could be provided as an alternative to previously described methods, or in addition to one or more of these, would be to provide one or more optical sources 15 to emit optical radiation into the body of phase-change material for detection by one or more appropriately located optical sensors (an optical sensing arrangement 17). The one or more optical sources 15 could operate on a single wavelength, or range of wavelengths (i.e. in effect a single color), or could operate at two or more spaced apart wavelengths (i.e. different colors). The radiation could be in the visible or infrared regions of the spectrum, or both in the event that multiple colors of light are used. The optical source 15 could be a source of incoherent light, such as an LED, or could be a laser, e.g., an LED laser. The optical source 15 could be a single red green blue light emitting diode. The optical sensing arrangement 17 can coupled to a processor (e.g., the processor of the interface unit) which is configured to estimate an amount of energy stored in the phase-change material based on information received from the optical sensing arrangement 17.

Another method of monitoring the state of the phase-change material which could be provided as an alternative to previously described methods, or in addition to one or more of these, would be to provide an acoustic source 19 configured to launch sound into the phase-change material within the heat exchanger, and an acoustic sensing arrangement 23 to detect sound launched from the acoustic source 19 after the sound has passed through the phase-change material. Preferably, the acoustic source 19 is configured to produce ultrasound.

The disclosure also provides an installation comprising an in-building hot water system including an interface unit as described in any alternative above, the input-side circuit of the heat exchanger being coupled to a heat pump, the output-side circuit of the heat exchanger being coupled to the in-building hot water system having a flow sensor and a temperature sensor, an electrical heater configured to heat water for the hot water system downstream of the output-side circuit of the heat exchanger, and a processor operatively coupled to the heat pump, the flow sensor, the temperature sensor and the electrical heater, wherein the processor is provided with logic to manage the use of the electric heater, the heat pump, and energy from the phase-change material to reduce energy consumption.

The disclosure further provides an installation comprising an in-building hot water system including an interface unit as described in any alternative above, the input-side circuit of the heat exchanger being coupled to a heat pump, the output-side circuit of the heat exchanger being coupled to the in-building hot water system having a flow sensor and a temperature sensor, an electrical heater configured to heat water for the hot water system downstream of the output-side circuit of the heat exchanger, and a processor operatively coupled to the heat pump, the flow sensor, the temperature sensor and the electrical heater, wherein the processor is provided with logic to manage the installation to provide a flow of hot water requiring a greater power input than the power of the heat pump.

Any of these installations further may further comprise one or more additional heat exchangers, the or each additional heat exchanger comprising an enclosure, and within the enclosure: an input-side circuit coupled to the heat pump; an output-side circuit coupled to the in-building hot water system; and a phase-change material for the storage of energy. Optionally, the installation may further comprise a pressure sensor in a cold water supply to the in-building hot water system, and a processor coupled to the pressure sensor, the processor being configured to generate a warning in the event that a loss of pressure is detected. Optionally, the processor is configured only to generate a warning in the event that the loss of pressure continues for more than a threshold time. Optionally, the installation further comprising a flow sensor in a cold water supply to the in-building hot water system, the flow sensor being coupled to the processor. Optionally, the processor is configured to use information from both the pressure sensor and the flow sensor in generating the warning.

The disclosure also provides a method of replacing a gas-fired combination boiler which is plumbed into an in-building hot water system, the method comprising: removing the gas-fired combination boiler to create an installation space; installing an interface unit as described in any alternative above in the installation space; coupling the output-side circuit of the heat exchanger to the in building hot water; and coupling the input-side circuit of the heat exchanger to the heat pump, so that water for the in-building hot water system can be heated by the heat phase-change material and/or the heat pump. Preferably, this method further comprising coupling the input-side circuit of the heat exchanger to an in-building space heating system. Preferably, the method further comprises operatively connecting a processor of the interface unit to a controller of the heat pump, to enable the processor to control aspects of the behavior of the heat pump.

The present application contains a number of self-evidently inter-related aspects and embodiments, generally based around a common set of problems, even if many aspects do have broader applicability. In particular the logic and control methods, whilst not necessarily limited to operating with the hardware disclosed and may be more broadly applied, are all particularly suited to working with the hardware of the various hardware aspects and the preferred variants thereof. It will be appreciated by the skilled person that certain aspects relate to specific instances of other features and the preferred features described or claimed in particular aspects may be applied to others. The disclosure would become unmanageably long if explicit mention were made at every point of the inter-operability and the skilled person is expected to appreciate, and is hereby explicitly instructed to appreciate, that preferred features of any aspect may be applied to any other unless otherwise explicitly stated otherwise or manifestly inappropriate from the context. Again for the sake of avoiding repetition, many aspects and concepts may be described only in method form or in hardware form but the corresponding apparatus or computer program or logic is also to be taken as disclosed in the case of a method or the method of operating the hardware in the case of an apparatus discussion. For an example of what is meant by the above, there are a number of features of both hardware and software relating to the combination of a fluid based (typically air source) heat pump and a phase-change material and an electric supplementary heating element and control by a processor (within the unit or remote or both). Although this is the preferred application, most methods and hardware are more generally applicable to other heat pumps (thermoelectric and ground source) and to other renewable energy sources (a pump for a solar array for example) and to alternative supplementary heating (including the less preferred arrangement of a combustion heater such as a gas boiler, or even a less efficient higher temperature lower COP heat pump) and alternative thermal storage, including multi-temperature thermal storage arrays. Moreover aspects which give particular arrangements for any of the components or their interaction can be used freely with aspects which focus on alternative elements of the system.

What is claimed is:

1. An energy bank including a heat exchanger, the energy bank comprising an enclosure, and within the enclosure:
   an input-side circuit of the heat exchanger for connection to, and to receive a first heat transfer liquid from, an energy source;
   an output-side circuit of the heat exchanger for connection to, and to supply a second heat transfer liquid to, an energy sink; and
   a phase-change material for storage of energy, the phase-change material being sealed within the enclosure and separated from the heat transfer liquids; and
   an electrical heating element configured to be used selectively to put heat into the phase-change material;
   wherein the phase-change material within the enclosure includes a plurality of resilient bodies that are configured to:
   reduce in volume in response to an increase in pressure caused by a phase change of the phase-change material; and
   expand again in response to a reduction in pressure caused by a reverse phase change of the phase-change material.

2. The energy bank of claim 1, wherein the resilient bodies are coupled to a matrix or lattice structure that serves to restrict displacement of the resilient bodies.

3. The energy bank of claim 1, wherein the input-side circuit and the output-side circuit within the enclosure are defined by tubular bodies, elongate protrusions extending into the phase-change material from each of the tubular bodies, wherein the elongate protrusions have higher thermal conductivity than the phase-change material.

4. The energy bank of claim 3 wherein the elongate protrusions together form one or more meshes.

5. The energy bank of claim 4 wherein the elongate protrusions comprise carbon fiber or copper.

6. The energy bank of claim 1, wherein the plurality of resilient bodies are configured to accommodate reversibly up to 10% expansion of the volume of the phase-change material during a change of phase.

7. The energy bank of claim 1, wherein the phase-change material comprises one or more paraffin waxes or a salt hydrate.

8. The energy bank of claim 7, wherein the one or more paraffin waxes comprise:
- n-tricosane $C_{23}$;
- paraffin $C_{20}$-$C_{33}$;
- n-tetracosane $C_{24}$;
- n-pentacosane $C_{25}$;
- n-hexacosane $C_{26}$;
- n-heptacosane $C_{27}$;
- n-octacosane $C_{28}$;
- n-nonacosane $C_{29}$;
- n-triacosane $C_{30}$;
- n-hentriacosane $C_{31}$;
- n-dotriacosane $C_{32}$;
- n-triatriacosane $C_{33}$;
- paraffin $C_{22}$-$C_{45}$;
- paraffin $C_{21}$-$C_{50}$;
- RT 70 HC; or
- wherein the salt hydrate comprises $Na_2S_2O_3 \cdot 5H_2O$ or $CH_3COONa \cdot 3H_2O$.

9. The energy bank of claim 1, wherein the enclosure is a generally rectangular cuboid defined by a first side having a length between 300 mm and 600 mm, a second side having a length between 300 mm and 600 mm, and a third side having a length between 150 mm and 350 mm.

10. The energy bank of claim 1, wherein the enclosure is contained within a thermally insulating jacket.

11. The energy bank of claim 1, further comprising one or more temperature sensors.

12. The energy bank of claim 1, further comprising one or more sensors to provide measurement data indicative of an amount of energy stored as latent heat in the phase-change material.

13. The energy bank of claim 12, further comprising an optical source configured to launch light into the phase-change material, wherein the one or more sensors include an optical sensing arrangement to detect light launched from the optical source after the light has passed through the phase-change material.

14. The energy bank of claim 13, wherein the optical source is controllable to produce light of different colors and the optical sensing arrangement is configured to detect at least some of the different colors.

15. The energy bank of claim 13, wherein the optical source comprises a plurality of separately activatable devices.

16. The energy bank of claim 12, further comprising an acoustic source configured to launch sound into the phase-change material, and an acoustic sensing arrangement to detect sound launched from the acoustic source after the sound has passed through the phase-change material.

17. An installation comprising an in-building hot water system including the energy bank of claim 1, the input-side circuit of the heat exchanger being coupled to a heat pump, and the output-side circuit of the heat exchanger being coupled to the in-building hot water system.

18. The installation of claim 17, further comprising a processor coupled to one or more sensors and configured to make a determination to trigger starting of the heat pump based on measurement data from the one or more sensors.

19. The installation of claim 18, the in-building hot water system including a flow sensor to provide a signal in response to opening of an outlet of the in-building hot water system, wherein the processor is coupled to the flow sensor and is configured to perform a determination of the amount of energy stored as latent heat in the phase-change material, and based on that determination to decide whether to provide a start signal to the heat pump.

20. The installation of claim 19, wherein a quantity of phase-change material has enough latent heat capacity to heat a predetermined quantity of water to a predetermined temperature in an interval from the opening of the outlet of the in-building hot water system until at least the heat pump begins to heat water in the in-building hot water system.

* * * * *